UNITED STATES PATENT OFFICE.

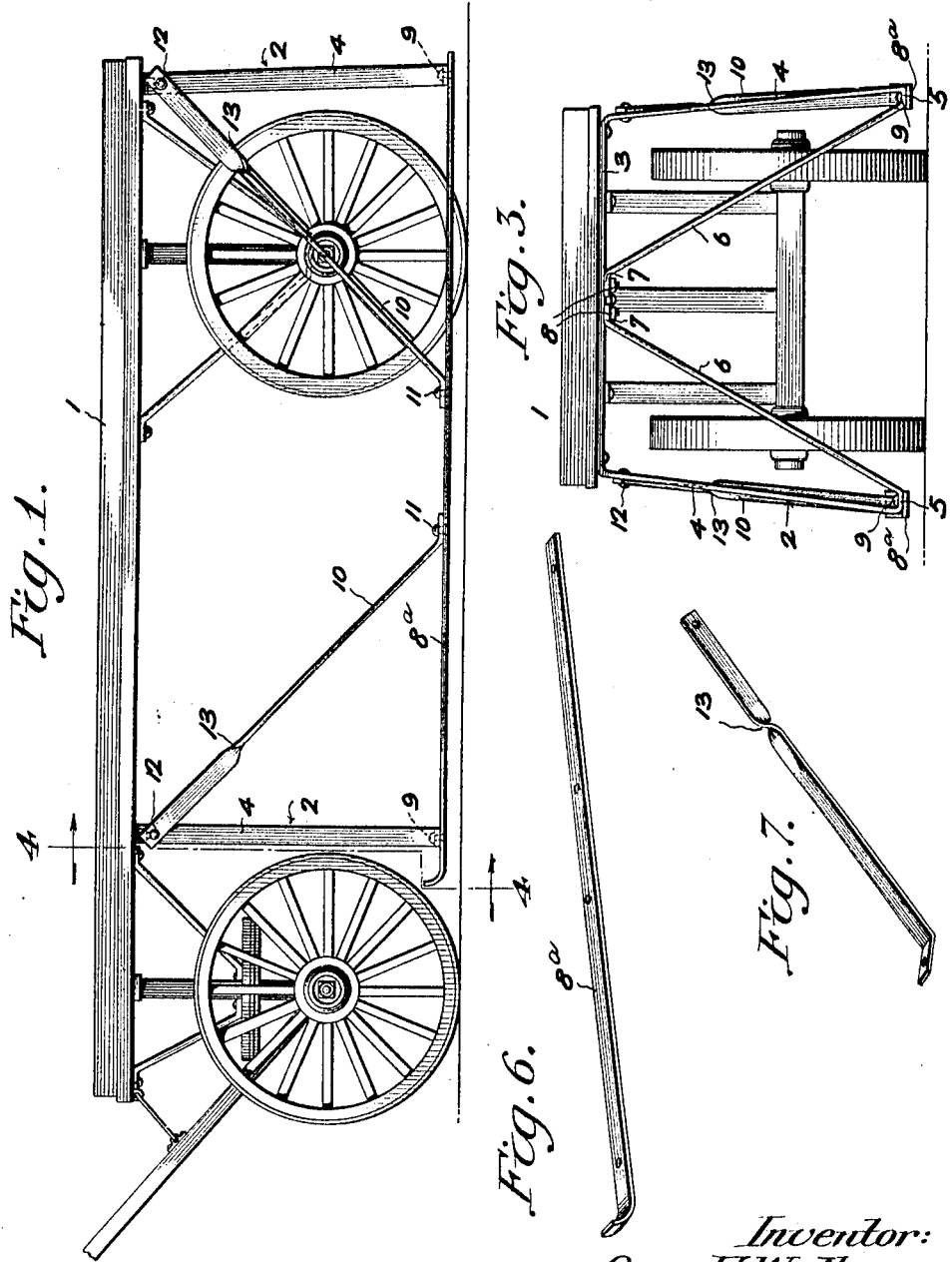

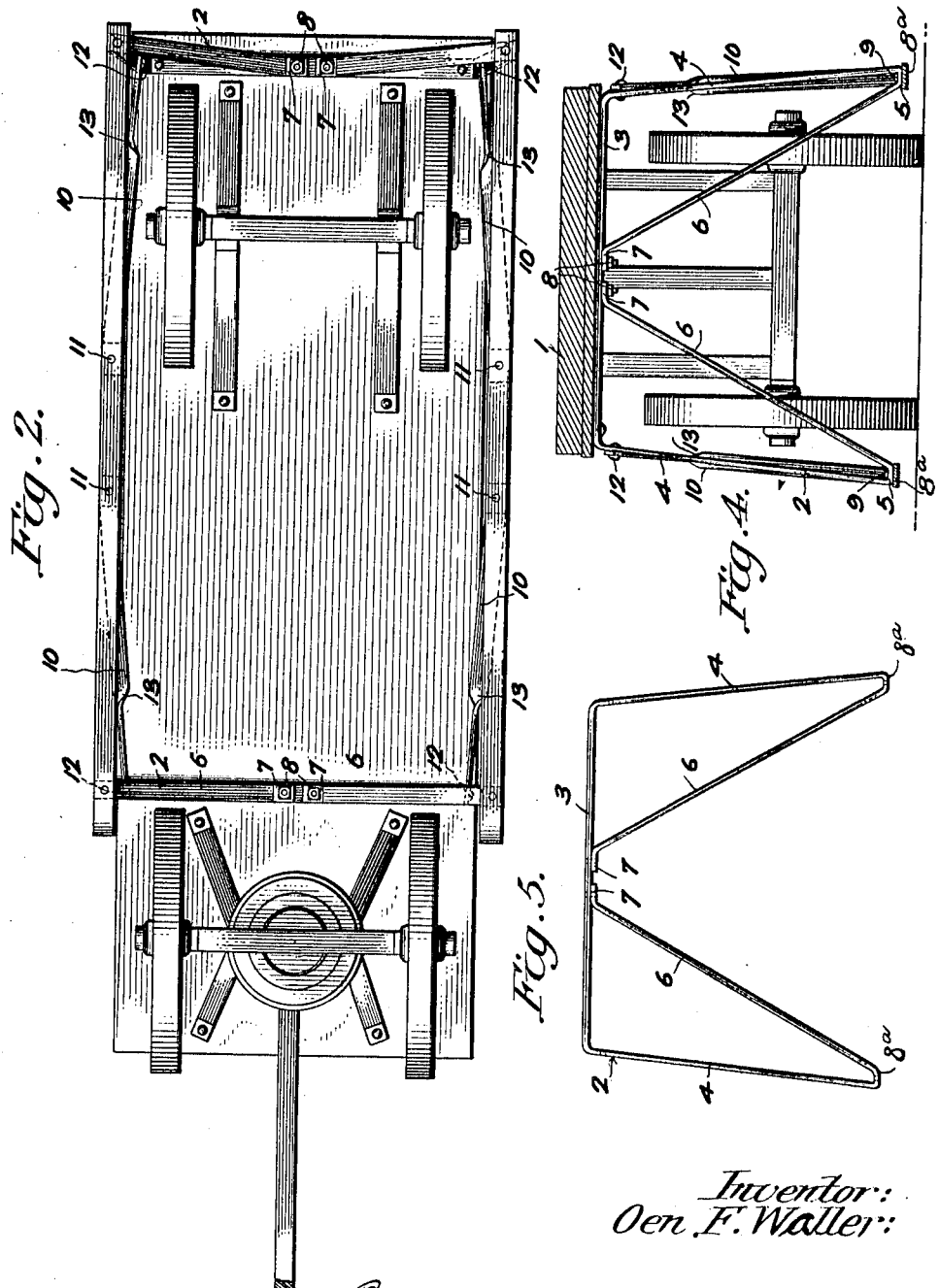

OEN F. WALLER, OF ABERDEEN, SOUTH DAKOTA, ASSIGNOR TO E. L. GRANTHAM AND WILLIAM G. PORTER, BOTH OF ABERDEEN, SOUTH DAKOTA.

SAFETY APPARATUS FOR TRUCKS, &c.

1,314,173.   Specification of Letters Patent.   Patented Aug. 26, 1919.

Application filed July 27, 1918. Serial No. 247,076.

*To all whom it may concern:*

Be it known that I, OEN F. WALLER, a citizen of the United States, residing at Aberdeen in the county of Brown and State of South Dakota, have invented certain new and useful Improvements in Safety Apparatus for Trucks, &c., of which the following is a specification, reference being had therein to the accompanying drawings.

This invention relates to an attachment for trucks, which trucks are used in railroad stations, or for hauling baggage or bundles in warehouses.

The object of the invention is the construction of a safety apparatus for trucks, which is comparatively simple in construction, inexpensive to manufacture, and durable and positive in operation.

With this and other objects in view, my invention consists of certain novel constructions, combinations, and arrangements of parts, as will be hereinafter fully described and claimed.

In the drawings:

Figure 1 is a view in side elevation of a truck equipped with my improved apparatus, while Fig. 2 is an inverted plan view of the apparatus shown in Fig. 1.

Fig. 3 is a rear view, in elevation, of the apparatus and truck, illustrated in Fig. 1.

Fig. 4 is a vertical, sectional view taken on line 4—4, Fig. 1, looking in the direction of the arrows.

Fig. 5 is a detached view, in elevation, of one of the transverse bracing frames of my apparatus.

Fig. 6 is a perspective view of one of the shoes or runners of the apparatus.

Fig. 7 is a perspective view of one of the side braces of the apparatus.

To better understand the nature of my invention, I wish it to be understood that my apparatus is to prevent tipping and turning over of trucks, wagons and other vehicles, thereby preventing damage to baggage, merchandise, etc., and insuring the safety of employees and persons passing in close proximity with the trucks equipped with my apparatus.

The shoes or runners of the apparatus hereinafter described are usually within a few inches of the surface of the platform or ground and project slightly outward from the wheels, so as to afford stability, and in case a wheel runs into a hole or depression, the shoe or runner will catch or rest upon the support, whether it be a platform or the ground, preventing the load from dropping or being shifted upon or off the platform of the truck. There is always danger of overturning a truck in turning the front truck wheels abruptly following it with a cross pull. Danger results to baggage frequently in this manner, and occasionally a passenger is hit by falling articles or baggage.

Therefore, to overcome the weaknesses of an ordinary truck, and to produce a truck equipped with means for preventing accidents, especially when the truck is loaded, I have attached to the platform 1 of a truck, a pair of transverse bracing frames 2, 2. Each frame 2 is, preferably, formed from a single piece of material, and comprises a flat truck-engaging portion 3, terminating at its ends in downwardly and outwardly-extending legs 4, each leg 4 having an apertured foot 5, and the inner ends of each foot 5 terminates in an inclined bracing portion 6, which portion 6 terminates at its upper end in an apertured lug 7; the apertures in lugs 7 registering with similar apertures in the flat platform engaging portion 3, whereby a pair of fastening means, such as bolts 8, 8 fasten the transverse bracing frame to the bottom or under side of the platform 1 of the truck.

Upon referring to Figs. 1 and 2, it will be seen that the transverse bracing frame 2 at the rear of the truck has its legs 4 and bracing portions 6 bent backwardly, whereas the front frame has the similar members formed in the same transverse plane; otherwise, the front and back transverse frames 2 are similarly constructed.

On each side of the truck, I place a shoe or runner 8ª, the runner 8ª being connected by a rivet 9 to the foot portions 5 of the transverse bracing frames.

On each side of the truck, I place a pair of inclined braces 10; each brace 10 is connected, at 11, to a runner 8ª, near its middle (Fig. 1), and is connected, at 12, to the legs of the transverse bracing frames. The lower end of each brace 10 is flattened, and through which the fastening means for attaching it to the runner is extended, as at 11, and the brace is twisted, at 13, intermediate its length, so as to place the upper end of the brace flat against the side of the leg of the frame, as shown.

Since the legs 4 of the bracing frames are bent outwardly, it will be seen (Fig. 4) that the runners 8ª are placed outside of the vertical plane in which the outer ends of the hubs of the wheels of the truck are located, thereby producing a very efficient device, for if the wheel or wheels sink into a rut or a crack in a platform, then the runner invariably engages a solid part of the platform or ground, stopping the tilting of the platform 1 of the truck, thereby preventing the dumping or shifting of the load upon the truck when loaded.

Further, it will be seen that I have securely braced the entire apparatus, so that this safety appliance is very strong and durable, and as the runners are placed very close to the platform or ground, the runner or runners will engage the ground upon a very slight sinking of one or all of the wheels, thereby allowing the safety appliance to perform its function of supporting the truck in a relatively horizontal position immediately upon one or more of the wheels sinking down a sufficient distance to place the runner in engagement with the platform or ground.

While I have described the preferred form of my invention, I wish it to be understood that I reserve the right to make such alterations, modifications, and changes to the same as shall be obvious to one skilled in the art to which this invention relates, and which alterations, modifications, and changes shall fairly fall within the scope of the appended claims.

What I claim is:

1. In an apparatus of the class described, the combination with a truck provided with a platform and a rear and a front truck, of a pair of transverse bracing frames secured to the under face of the platform, each frame being formed from a single piece of material and comprising a flat truck-engaging portion, depending outwardly-extending legs, feet formed integral with the lower ends of said legs, upwardly and inwardly-extending bracing portions integral with the inner ends of said feet, each bracing portion terminating in an apertured lug resting against the under face of said truck-engaging portion of the frame, means extending through said apertured lugs and the truck-engaging portion and securing said frame to said platform, runners fastened to the feet of said frames, and braces secured to the runners near their middle and to the legs of the frames near their upper ends.

2. In a safety apparatus of the class described, the combination with a pair of trucks, each truck provided with a pair of wheels, a flat platform supported by said trucks, of a front and a rear transverse bracing frame attached to said platform behind the wheels of the trucks, said frames each being formed from a single piece of material and including a flat top portion, outwardly-extending side legs, inwardly-extending feet upon the lower ends of said legs, upwardly-extending bracing portions at the inner ends of said feet, each bracing portion provided with an inwardly-extending flat lug upon its upper end engaging the flat portion of the frame, the rear frame having its legs, feet and upwardly-extending bracing portions bent rearwardly, a pair of runners positioned under the feet portions of said frames, means securing said runners and feet portions together, a pair of inclined braces at each side of the platform, each brace provided with a flat portion at its lower end engaging the upper face of a runner, means securing said flat portions of the braces to the runners, each brace being twisted intermediate its length and having its upper portion lying flat against the outer face of a leg of a bracing frame, and means securing said flat upper portion of the braces to said frames.

In testimony whereof I hereunto affix my signature.

OEN F. WALLER.

Copies of this patent may be obtained for five cents each, by addressing the "Commissioner of Patents, Washington, D. C."